United States Patent [19]

Lee

[11] Patent Number: 4,685,071

[45] Date of Patent: Aug. 4, 1987

[54] METHOD FOR DETERMINING THE COLOR OF A SCENE ILLUMINANT FROM A COLOR IMAGE

[75] Inventor: Hsien-Che Lee, Penfield, N.Y.

[73] Assignee: Eastman Kodak Company, Rochester, N.Y.

[21] Appl. No.: 712,498

[22] Filed: Mar. 18, 1985

[51] Int. Cl.⁴ ............................................. G01J 1/00
[52] U.S. Cl. ................................. 364/526; 354/430; 355/38
[58] Field of Search .................. 364/526; 354/430; 355/35, 38; 356/405, 406

[56] References Cited

U.S. PATENT DOCUMENTS

| | | | |
|---|---|---|---|
| 3,029,691 | 4/1962 | Goddard et al. | 88/24 |
| 3,502,410 | 3/1970 | King et al. | 355/38 |
| 3,697,174 | 10/1972 | McCune | 355/38 |
| 3,804,531 | 4/1974 | Kasaka et al. | 356/406 |
| 4,079,388 | 3/1978 | Takahama et al. | 354/430 |
| 4,120,581 | 10/1978 | Takahashi et al. | 355/38 |
| 4,154,523 | 5/1979 | Rising et al. | 355/38 |
| 4,192,605 | 3/1980 | Fergg et al. | 355/38 |
| 4,247,202 | 1/1981 | Failes | 356/405 |
| 4,339,517 | 7/1982 | Akimoto | 430/30 |
| 4,389,118 | 6/1983 | Yuasa et al. | 364/526 |
| 4,406,538 | 9/1983 | Bühler | 355/38 |

*Primary Examiner*—Gary Chin
*Assistant Examiner*—Danielle B. Laibowitz
*Attorney, Agent, or Firm*—Thomas H. Close

[57] ABSTRACT

A method of determining the color of light employed to illuminate the scene in a color image from the image itself, relies upon detecting the color of the specularly reflected light in the image. In a preferred mode of practicing the invention, the color of specularly reflected light is detected by detecting a plurality of sets of points having constant hue and varying saturation on a plurality of differently colored surfaces in the scene, and determining the locus of the intersection of straight lines fit through the color values of the sets of points. The locus of the intersection of the straight lines indicates the color of the scene illuminant. In an application of the method in a color printer, the determined illuminant color is employed as the aim point in the photographic printing process.

13 Claims, 8 Drawing Figures

METHOD FOR DETERMINING THE COLOR OF A SCENE ILLUMINANT FROM A COLOR IMAGE

TECHNICAL FIELD

This invention relates to color image processing, and more particularly to a method for determining, from a color image, the color of light that was used to illuminate the scene in the image.

BACKGROUND ART

In most automated color image reproduction systems such as a color photographic system or electronic color image sensing and display systems, the color balance of the reproduced image is automatically corrected, based upon measurements performed on the original color image (e.g. a color negative in tne case of color photography, or a recorded digital color image in the case of electronic color image systems). In general, the aim of the color correction is to cause the overall average color of the reproduced image to be a shade near gray (The Evan's "Gray World" Hypothesis in color photographic printing). The particular shade near gray toward which the image is adjusted is called the "aim point" of the color correction process. Since the location of the aim point in color space is a strong function of the color of the light that was used to illuminate the scene in the image (the scene illuminant), knowledge of the color of the scene illuminant enables a more accurate color correction to be made, thereby improving the appearance of the reproduced image, and for photographic printing, reducing the number of remakes required.

One approach to identifying the color of the scene illuminant involves a detector in the camera that samples the light coming from the light source and records a code on the film representative of the type of illuminant detected. The code may then be used in the image reproduction step (e.g. color printing) to adjust the aim point appropriately. This scheme has the drawback of adding complications to the camera, and is not generally employed in commercially available cameras. Additionally, the technique used to estimate the illuminant often relies upon some quality of the light other than a direct measurement of the wavelength, such as the flicker frequency of the light to distinguish for example between tungsten and fluorescent illumination.

Another approach, which is used in some commercial photographic printers, is to attempt to estimate the type of illuminant from the color photographic negative itself, either by the personal observation of an operator, which has the disadvantage of not being automatic; or by automatic classification equipment using LATD (Large Area Transmission Density) signals.

U.S. Pat. No. 4,339,517 issued July 13, 1982 to Akimoto provides an example of such a classification method. The classification method disclosed by Akimoto employs measurements of the color negative such as color LATD measurements, measurements of the hue at the maximum density point, the ratio of areas of particular colors, and the average hue of points having flesh color in an attempt to distinguish between under and over exposed negatives, negatives subject to color failure, negatives exposed in fluorescent or tungsten light, high color temperature or low color temperature negatives, and aged negatives. Each negative is color corrected according to the group to which it is assigned based on the classification method. The classification scheme proposed by Akimoto provides only a rough estimate of the color of the illuminant, and the estimate is subject to distortions by the contents of a scene (called color subject failure). To date, no method has been provided for accurately determining the color of the illuminant from the image itself, particularly in the presence of color subject failure. A method for more accurately detecting the color of scene illuminant would enable more accurate color correction, thereby improving the quality of photographic prints or electronic displays of images, and reducing the number of remakes in the case of photographic prints. It is the object of the present invention to provide a more accurate method of determining the color of the scene illuminant from a color image.

DISCLOSURE OF THE INVENTION

The object of the present invention is achieved by providing a method for determining the color of light employed to illuminate a scene in a color image, by detecting the color of the specularly reflected light in the scene. In a preferred mode of practicing the invention, the color of the specularly reflected light is detected by detecting a plurality of sets of points having constant hue and variable saturation on a plurality of differently colored surfaces in the image, and determining the locus of the intersection of straight lines fit through the color values of the sets of points. The locus of the intersection of the straight lines corresponds to the color of the scene illuminant. The detection of color changes independent of brightness changes is facilitated by transforming the image to a color space having chromaticity coordinates. Points in the transformed color space are detected along edges where the color of the image is changing most rapidly. A determination is made whether the rapid color changes are due to a change in saturation or hue, and points are selected in the neighborhood of rapid color changes due to changes in saturation. The distinction between changes in saturation and hue is made by selecting sets of points on both sides of the rapid color change edge, determining the slopes of the straight lines fit through the color values of the respective sets of points on both sides of the edge, and identifying the rapid color changes as due to changes in saturation if the slopes of the straight lines are equal. In a preferred embodiment of the method, many sets of points representing constant hue and changing saturation are collected, and a point representing the average intersection of all the straight lines is determined to detect the color of the scene illuminant, thereby reducing the affects of noise on the determination.

In one mode of practicing the invention, the method is employed in a color photographic printer having color correction capability, and the detected scene illuminant color is employed as the aim point in the color printer.

In another mode of practicing the invention, in a digital color image reproduction system, such as a scanned color photographic printer, or an electronic color imaging system, the local scene illuminant is detected in different local regions of the image, and the color of the image is corrected locally, employing the locally detected scene illuminants as aim points.

MODES OF CARRYING OUT THE INVENTION

Figure 2:
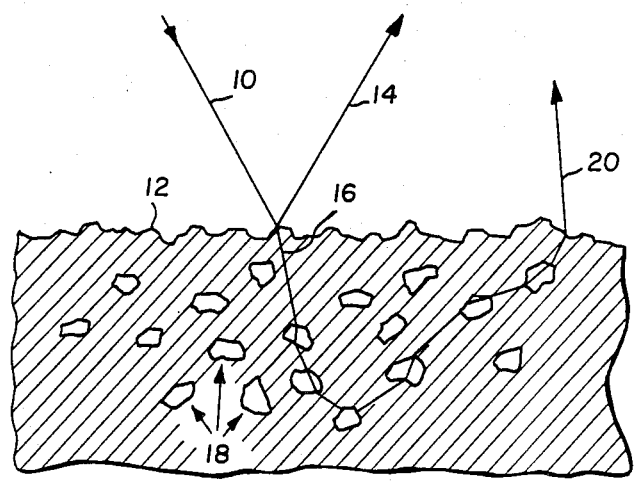
FIG. 2 is a schematic diagram showing the specular and diffused components of the light reflected from a colored surface.

Before describing the method of the present invention, some theoretical background helpful in understanding the principle of operation of the invention will first be reviewed. Referring first to FIG. 2, when incident light, represented by ray 10, is incident on a surface of nonhomogeneous colored material 12, part of the incident light, represented by ray 14, is reflected immediately from the surface of the material 12. The remainder of the incident light, represented by ray 16, penetrates into the material. The light entering the material is scattered around within the material by pigment particles 18. Part of the light energy scattered in the material is absorbed, and part is reflected back to the surface and reemitted as a diffuse component of reflected light, represented by ray 20.

The immediately reflected component of the light (ray 12) is called the specular component of the total reflected light. The reemitted component (ray 20) is called the diffuse component since the light reemitted from the material is emitted in equal intensity in nearly all directions.

For the surfaces of many nonhomogeneous materials, the specular component of reflected light has a spectral energy distribution very near to that of the incident light. That is to say, the color of the specular component of reflected light is very close to the color of the light illuminating the surface. This is true for painted surfaces, plastic surfaces, skin and foliage; but is not generally true for reflections from surfaces of homogeneous materials such as metal. The spectral energy distribution (i.e. the color) of the diffuse component of the reflected light is modified by the pigments in the surface of the material, and therefore represents the color of the material. Thus if the color of the specularly reflected light in a photograph could be measured, this would give a good estimate of the color of the scene illuminant. If the color of the diffusely reflected light could be eliminated from consideration, the problem of color subject failure would not influence the determination of the color of the scene illuminant.

Figure 3:
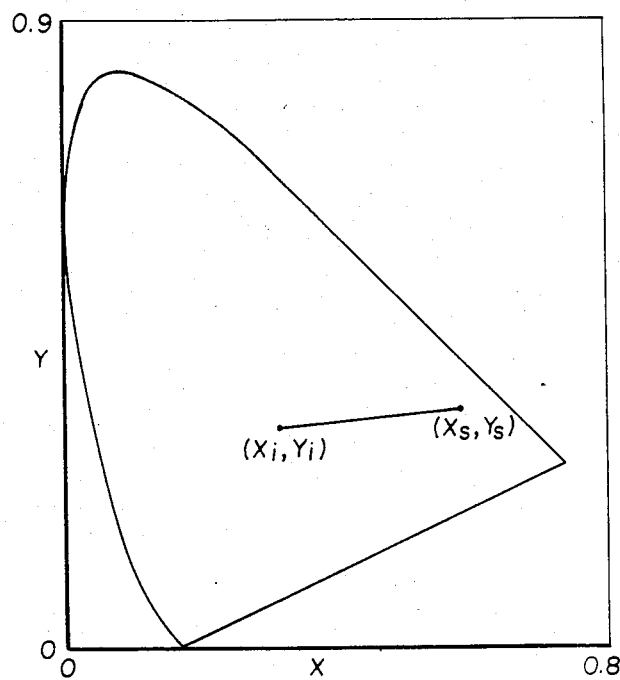
FIG. 3 is a CIE chromaticity diagram showing the locus of chromaticities corresponding to colors produced by mixtures of specularly reflected and diffusely reflected light.

Since the light reflected from the surface of an object is a mixture of specularly and diffusely reflected light, the color of the scene illuminant cannot be measured directly by measuring the colors of surfaces in a color image. Perceptually, the specular component of the reflected light appears to reduce the saturation of the color of the diffusely reflected component. In a standard color space, each point represents a different color. For example, in the CIE, x,y chromaticity space, each point represents a certain color as seen by the CIE standard observer. If two colors $(x_1, y_1)$ and $(x_2, y_2)$ are additively mixed in various proportions, the resulting colors will fall on a straight line connecting the two points in the color space. Since the reflected light from the surface of a nonhomogeneous material is a mixture of the specular (illuminant color) component, and the diffuse (color of the material) component, the colors from different spots on the same surface will fall on a straight line in a chromaticity diagram. FIG. 3 illustrates a CIE x,y chromaticity diagram showing a line representing the locus of points between an illuminant color $(x_i, y_i)$ and a surface color $(x_s, y_s)$ Colorimetrically, these colors from the same surface are said to have the same dominant wavelength with respect to the illuminant color, but different purity. If the color of a surface is measured at a number of points, the colors measured at the points will fall on a straight line pointing to the illuminant color. If sets of points on two surfaces having different spectral reflectance functions (i.e. different color) are measured, the points will define lines that intersect at a point representing the illuminant color. Since two lines uniquely determine a point, the illuminant color can be computed. Therefore, if a given scene contains more than two surfaces of different colors, the illuminant color can, in principle, be determined.

Figure 4:
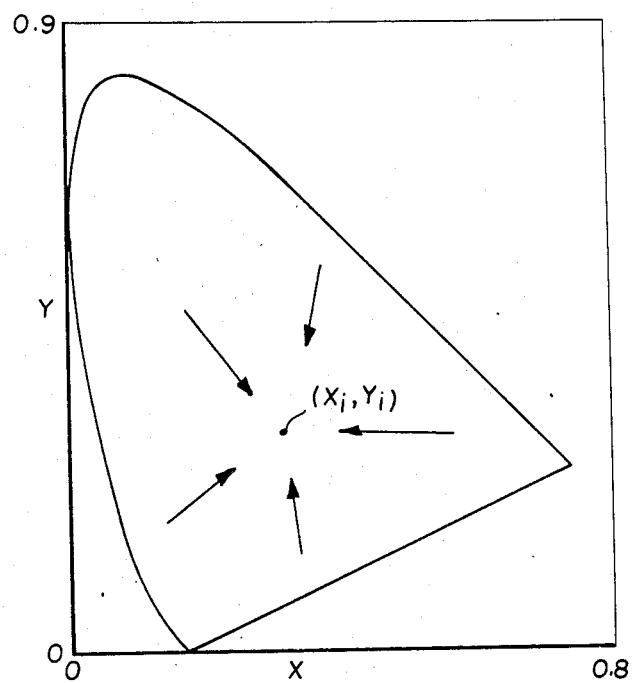
FIG. 4 is a CIE chromaticity diagram showing the locus of chromaticities corresponding to colors measured on a plurality of surfaces of different colors illuminated by the same illuminant.

FIG. 4 is a CIE x,y chromaticity diagram showing the locus of straight lines fit to several sets of points taken from several differently colored surfaces in a scene. The lines all point to a common intersection $(x_i, y_i)$ identifying the illuminant color.

In practice, if there are more than two surfaces of different colors, there will be more than two such straight lines that can be generated. The straight lines may not all pass through exactly the same point due to noise in the measurement process, quantization noise in the image digitization process, mutual illumination among the objects, or the presence of more than one illuminant for the scene. In this case, the computing of the illuminant color can be performed as a voting process. The color which gets the majority of votes can be chosen as the illuminant color. In effect, every surface reflection in the image casts a vote for the color of its illuminant.

The following equations represent a model of the reflectance of light from surfaces in a scene.

$$Er = k * Lr^* [R * f(i,v) + S * h(i,v)] \quad (1)$$

$$Eg = k * Lg^* [G * f(i,v) + S * h(i,v)] \quad (2)$$

$$Eb = k * Lb^* [B * f(i,v) + S * h(i,v)] \quad (3)$$

where Lr, Lg and Lb are the incident surface irradiances obtained by integrating the incident radiances over all incoming light directions with respect to the red, green, blue sensitivity functions of the imaging system. R, G and B are the diffuse reflectance factors and S is the specular reflectance factor. Since the specular component is assumed to be neutral, i.e. all wavelengths are reflected equally, the same factor S is used for all three primary colors. Er, Eg and Eb are the image irradiances recorded by the system. The functions f and h represent the angular dependence of the reflection coefficients. The variables i and v are the incident and the viewing angles with respect to the surface normal.

From equations (1), (2) and (3), we have the following relations; Assuming R, G and B are all different, then, $$Eb/Er = A * (Eg/Er) + C \quad (4)$$

$$\text{where } A = (Lb/Lg) * (B-R)/(G-R) \quad (5)$$

$$\text{and } C = (Lb/Lr) * (G-B)/(31\ R) \quad (6).$$

Equation (4) represents a straight line in the (Eg/Er, Eb/Er) color space. If G=R, then it is a vertical line. If R=G=B, then it degenerates into a single point, which is the illuminant color. To prove that the line of equation (4) passes through the illuminant color point, we can substitute Lg/Lr for Eg/Er and Lb/Lr for Eb/Er respectively of equation (4), and the equation still holds. Therefore, if there are two or more surfaces of different colors in the scene, then two or more lines can be determined and the point of intersection of these lines is the illuminant color.

To determine the illuminant color (for example from a color photographic image) according to the present invention, the photographic image is scanned in three colors and the color values, such as transmission densities Dr, Dg and Db are recorded. The transmission densities are functions of the logs of the irradiances (Er, Eg, Eb) of surfaces in the image. The measured image irradiances are clustered into groups of points corresponding to at least two differently colored surfaces in the image, and lines are fit through the groups of points. The intersection of the lines indicates the color of the illuminant The problem of segmenting an image into regions corresponding to surfaces of different colors is a difficult one. The steps outlined below avoid this problem.

The saturation change of the reflected light due to the presence of the specular component may be quite small, if the surface is not smooth. To reduce the error in the computation, information is taken from where the color saturation changes very rapidly. However, since the saturation of a color is defined in terms of the illuminant, the saturation cannot be determined until the illuminant is known. This problem is also avoided by the approach outlined below.

One simple way to detect color changes without being confused by the brightness change is to operate in a chromaticity space having dimensions representing ratios of image irradiances (Er, Eg and Eb), or equivalently, having dimensions representing differences in transmission densities (Dr, Dg and Db). A transformed space can be defined using either (Eg/Er, Eb/Er) or (Er/(Er+Eg+Eb), Eg/(Er+Eg+Eb)) as new variables. Changes in one of the chromaticity variables are then detected. Changes in one of the chromaticity variables signal where the color is changing (either saturation change or hue change, or both). The points where color changes most rapidly will be called color edge points. Once the points on the color edges are located, the next step is to check whether the change at the color edge is due to a change in the color of the material, or due to a change in the amount of the specular component of reflected light. Color changes due to changes in the color of the material are rejected, and color changes due to changes in the specular component of the light are retained.

The criterion used to distinguish between both types of color change is equation (4). If the color change is due to changes in the amount the specular component, the (Eg/Er, Eb/Er) measurements collected on both sides of the detected color edge will satisfy equation (4). If equation (4) is not satisfied, the color edge is most likely due to changes in the color of the material, and the points are rejected.

Figure 7:
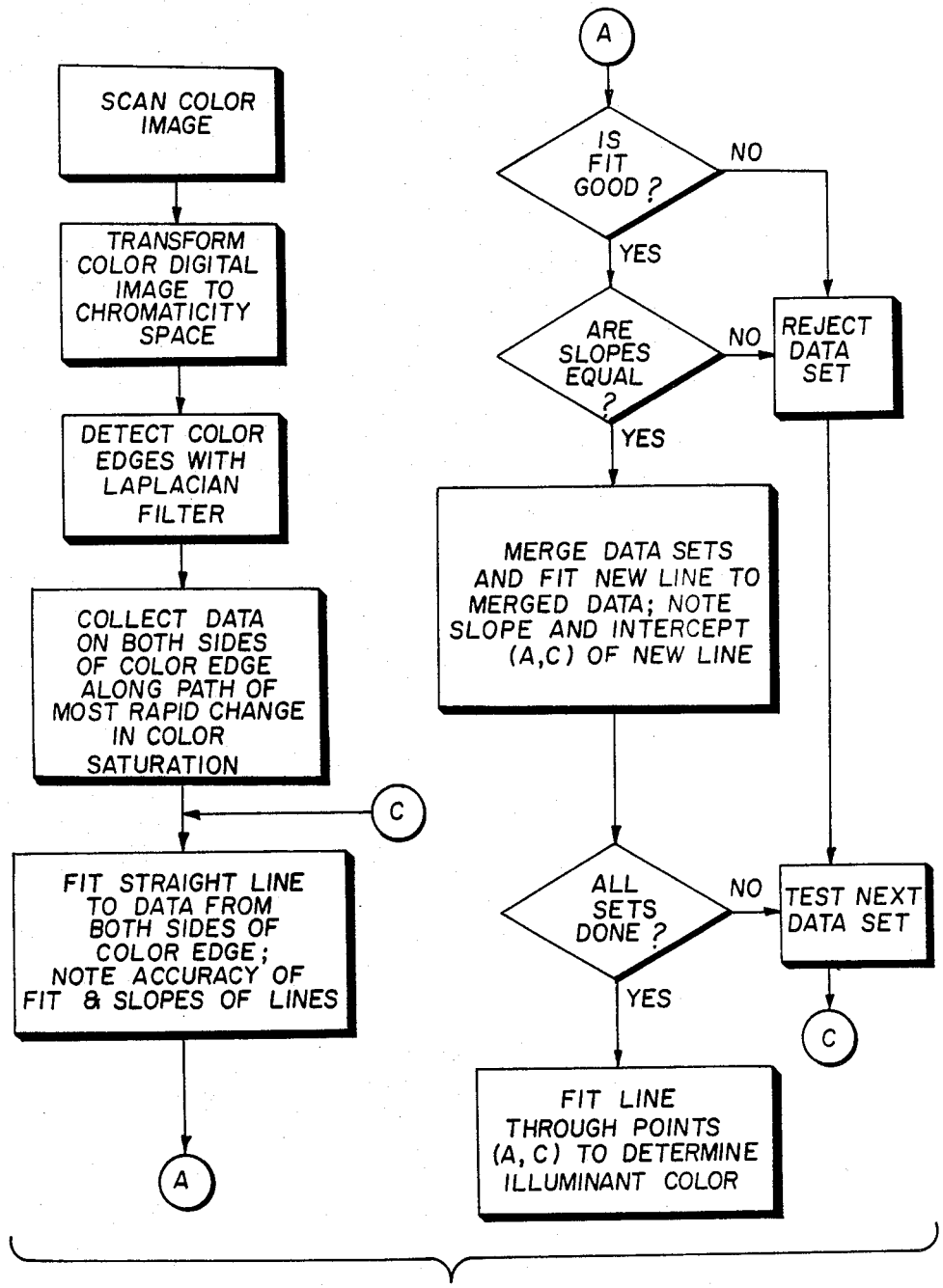
FIG. 7 is a flow chart illustrating the steps in a preferred mode of practicing the present invention.

Detailed steps involved in the method of detecting the color of a scene illuminant from a color photograph will now be described with respect to the flow chart of FIG. 7. After the image is scanned, the scanned values are transformed into the chromaticity space (Eg/Er, Eg, Eb/Er). Color edges are detected by convolving the chromaticity components Eg/Er, Eb/Er of the images with a Laplacian Gaussian filter. In practice, several Laplacian Gaussian filters covering a range of sizes are applied to the image, and the output from the filter of the size that most successfully detects color edges is chosen. Such use of different sized filters to detect image features in digital image processing is well known, and is employed because the size of the features in an image vary with such factors as the distance from the camera, and the magnification of the lens.

The Laplacian Gaussian filter detects the zero-crossing points in the chromaticity components of the image. These zero-crossing points lie on the detected color edges. The Gaussian feature of the filter functions to smooth out the image to reduce the noise, and the Laplacian feature of the filter operates to take the non-directional second derivatives of the smoothed image. Local gradient maximums will have zero second derivative values.

To collect data on both sides of the color edge, a path is followed where the color saturation is changing fastest, so that data can be fit to equation (4) more reliably. However, as noted above, changes in the saturation cannot be defined unless the reference illuminant color is known. For most surfaces, however, the diffuse component of the reflected light appears to be equally bright from all viewing angles. The major change in the image irradiance is therefore due to changes in the intensity of the specular component. Therefore, where the image irradiance changes quickly, the color saturation is also changing quickly. As a result, if the data is collected along the steepest ascent and steepest descent directions of one of the image irradiances (for example, the green irradiance Eg), there is a good chance that the change in irradiance will be due to a changing specular content of the light.

From each color edge point, searches are conducted along the steepest ascent and the steepest descent directions in Eg to collect (Eg/Er, Eb/Er) values, which are stored in two sets: one set containing data from the steepest ascent search, and the other set containing data from the steepest descent search. The search is stopped when either another zero-crossing is found or the path length is longer than the size of the Gaussian smoothing window.

A straight line (equation (4)) is fit through each of the two sets of (Eg/Er, Eb/Er) values so collected. The accuracy of the fit and the slopes of the lines are noted. If the fit to either set of data is not good, or the two lines differ significantly in slopes, then the two data sets are rejected since the change in color was probably not due to simply a change in saturation. On the other hand, if the fits are good and the slopes agree, the two data sets are merged in and straight line is fit to to the merged set of data points to determine the parameters A and C in equation (4). This procedure is repeated for every Cdetected color edge point in the image.

Figure 5:
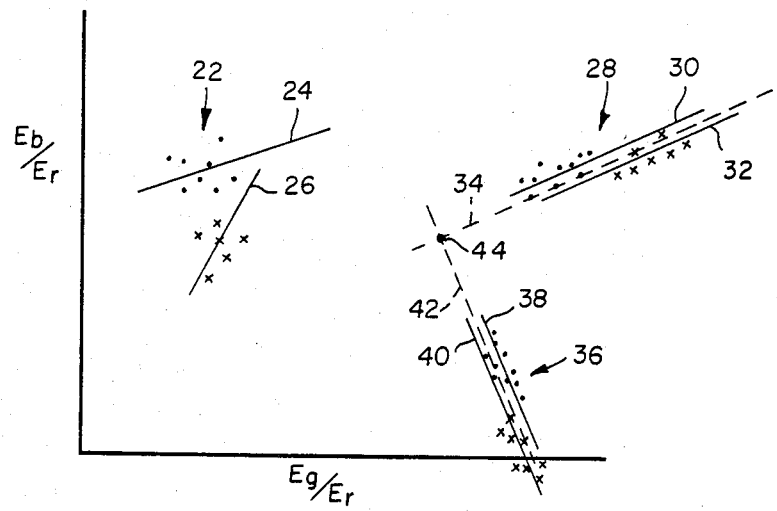
FIG. 5 is a graph showing points plotted in a transformed color space useful in explaining a preferred mode of practicing the present invention.

FIG. 5 illustrates the data selection process. The points indicated with dots represent the points collected in the steepest ascent direction and the points indicated with x's represent the points collected in the steepest descent direction around a color edge point. The sets of points labelled 22 will be rejected, because the line fit is not good, and the slopes of the two lines 24 and 26 which fit to the groups of points are not the same. The sets of points labelled 28 are acceptable since the linear fits are good and the slopes of the lines 30 and 32 that are fit through the points are the same. The sets of points representing the steepest ascent and descent are combined and a new line 34 is fit through the combined set. Similarly, the sets of points labelled 36 are accepted. Since the lines 38 and 40 provide a good fit through the sets of points and their slopes are the same. A line 42 is fit through the combined sets of points 36.

If only the two sets of points 28 and 36 were available, the color of the illuminant would best be determined by the point 44 defined by the intersection of the lines 34 and 42. In practice, many sets of points will be available from the image, and to achieve the best accuracy in estimating the color of the illuminant, all of the sets are employed to estimate the illuminant.

After processing the whole image, a set of slopes and intercepts (A,C) resulting from the straight line fits have been determined. Since all the lines so determined should pass through one common point, i.e. the illuminant color point, all the (A,C)'s should fall on a straight line in an (A,C) plane. This can be seen by substituting Lg/Lr and Lb/Lr for Eg/Er and Eb/Er of equation (4) as follows:

$Lb/Lr = A * Lg/Lr + C$ and therefore, $C = -(Lg/Lr) * A + (Lb/Lr)$.

Figure 6:
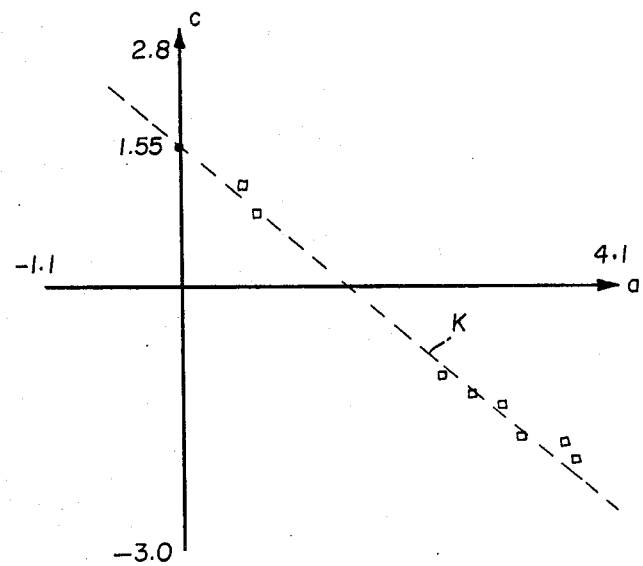
FIG. 6 is a graph useful in describing the practice of the present invention.

By fitting a straight line K through all the (A,C) points, the illuminant color (Lb/Lr, Lg/Lr) is determined as follows:

Lb/Lr=the intercept of line K on the (A,C) plane—Lg/Lr=the slope of line K on the (A,C) plane. This step is illustrated in FIG. 6, where a straight line K is shown fitted through a group of measured points (A,C). The numbers used in FIG. 6 refer to the experimental example described below.

An alternative to fitting a straight line K through all the (A,C) points is to use a majority voting method. The (Eg/Er, Eb/Er) coordinate plane is first quantized into discrete accumulator cells. For each (A,C), a straight line is drawn on the plane. The count of each accumulator cell is incremented by one each time a straight line passes through its coordinate interval. The cell which receives the majority of votes is chosen as the locus of the illuminant color. This accumulator method is potentially less sensitive to noise, but is more computationally intensive.

Figure 1:
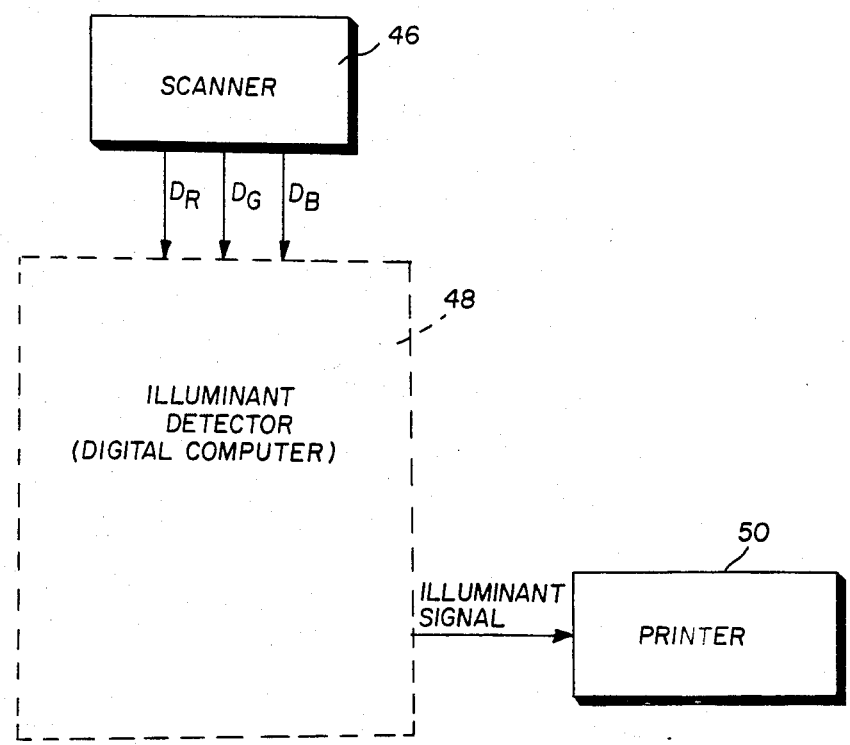
FIG. 1 is a schematic block diagram showing apparatus for practicing the method of the present invention.

Referring now to FIG. 1, apparatus employing the method of the present invention will be described. The apparatus includes a film scanner 46 such as a graphic arts film scanner for producing digital signals Dr, Dg and Db representing the color densities of a photographic original such as a photographic negative. The digital signals are applied to a digital computer 48 that is programmed to detect the illuminant color in the photograph as described above. A signal representing the detected illuminant color is supplied to a photographic printer 50 as an aim point for the photographic correction process. The operation of photographic printers being well known in the art, no further description will be provided for the printer 50.

In another application, the method of illuminant detection is employed in a scanning color printer of the type wherein a color photographic original is scanned by an electro-optical scanner to generate a digital color image, the digital color image is processed in a digital image processor, and the processed digital color image is displayed, for example by scanning the color image onto color photographic paper. In this application, the digital color image is already available, and no separate scanning operation is required to obtain the data needed for the scene illuminant detection method. The detected scene illuminant is then employed in the digital image processing method to produce the processed digital color image. Similarly, the method is applied to a digital color image processing system where the original image was sensed with an electronic color image sensor such as a color television camera tube or solid state color image sensor, and the digital color image is displayed on a color monitor. In scanned output type color image systems, such as those outlined above, it is possible to apply the illuminant detection method to different local areas of an image, and to implement the color correction locally depending upon the color of the locally detected scene illuminant. This approach has an advantage when different parts of the scene were illuminated by different color illuminants, such as tungsten and daylight.

To test the method for detecting scene illuminant color, the inventor generated a scene consisting of two spheres illuminated by a light source and a uniform background light. The digital color image was 512×512 pixels, with 8 bits/color and expressed in log irradiance space. The parameters used in the reflection model (equations (1), (2) and (3)) were: Lr=128.0, Lg=160.0, Lb=200.0. The color and reflectivity of one of the spheres was specified by, R=0.5, G=0.4, B=0.32, S=0.3. The color and reflectivity of the other sphere was specified by, R=0.2, G=0.5, B=0.3, S=0.3. For both spheres, the diffuse component of reflected light was modeled as a perfect Lambertian reflection, and the specular component was modeled as a function of the cosine raised to the 20th power of the angle between the viewing angle and the specular reflection angle.

Figure 8:
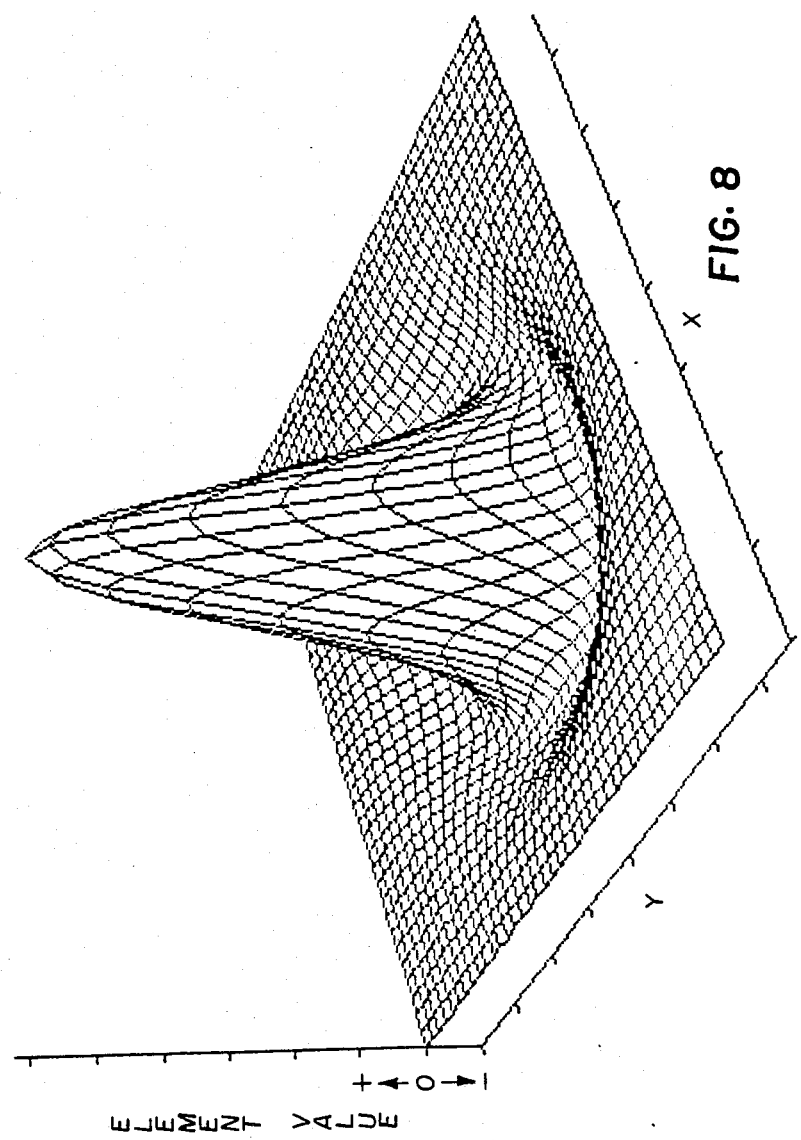
FIG. 8 is a graph illustrating the shape of the two dimensional Laplacian Gaussian digital filter employed in a preferred embodiment of the invention.

The computer generated sphere scene was a three-color digital image (Dr, Dg, Db), where Dr, Dg and Db are logarithms of the image irradiances Er, Eg and Eb. The input image was transformed into three images (Dg−Dr, Dg, Db−Dr). The method described above for detecting the illuminant color was applied to these three images using Laplacian Gaussian filters of four different sizes. The standard deviations of the experimental filters were 1, 2, 4, and 8 pixels wide. The shape of a Laplacian Gaussian filter is shown in FIG. 8. The filter with a standard deviation of 8 pixels detected a number of color edges. The other filters, due to their smaller sizes, did not successfully detect color edges and therefore were not employed to detect the illuminant color in the image. The size of the Laplacian Gaussian filter having a standard deviation of 8 pixels was 65×65 elements. The filter was scaled by 6400 and the response amplitudes less than 1.0 were set to 0.0. (The filter and convolution were done in real numbers.) Zero-crossings were determined by thresholding the horizontal and vertical gradients of the convolved images. The threshold employed was 16.

The illuminant color used in generating the sphere scene was:

$$Lg/Lr = 160.0/128.0 = 1.25$$

$$Lb/Lr = 200.0/128.0 = 1.5625.$$

The illuminant detected by the method was:

$$Lg/Lr = 1.24, \text{ and}$$

$$Lb/Lr = 1.56.$$

As can be seen by comparing the actual illuminant color and the illuminant color detected by the method according to the present invention, the method computed illuminant color was very close to that used to generate the input scene.

INDUSTRIAL APPLICABILITY AND ADVANTAGES

The above described method for determining the color of scene illuminant from a color photographic image can be employed in a color image reproduction process to enable more accurate color correction. For example, the detected illuminant color can be used as the color correction aim point in a conventional color printer. The method may also be employed in a digital printer to detect local illuminants. The method has the advantage of providing a more accurate method for detecting the color of scene illuminant from a color photographic image, than any method known in the prior art. The method has the further advantage of not being effected by "color subject failure".

What is claimed is:

1. A method for determining the color of a scene illuminant from a color photographic image, of a scene containing a plurality of differently colored specularly reflecting surfaces, comprising the steps of: scanning the color photographic image to produce a digital color image; transforming the digital color image to a chromaticity space; and processing the transformed digital color image to detect the color of specularly reflected light in the scene, the color of the specularly reflected light corresponding to the color of the scene illuminant.

2. The method for determining the color of scene illuminant claimed in claim 1, wherein the step of processing the transformed digital color image to detect the color of the specuarly reflected light further comprises the steps of:
   detecting a plurality of sets of points in the transformed digital image having constant hue and varying saturation from said plurality of surfaces in the image; plotting chromaticity values of the detected points in the sets on a chromaticity plane; fitting a straight line through the chromaticity values of each set; and
   determining a locus of an intersection of said straight lines, said locus representing the color of the scene illuminant.

3. The method for determining the color of scene illuminant claimed in claim 2, wherein the step of detecting a plurality of sets of points in the transformed digital image further comprises the steps of: detecting color edges in the transformed digital color image;
   detecting sets of points along paths crossing the color edges where the color of the image changes most rapidly;
   determining whether the rapid color change is due to a change in saturation or hue; and
   selecting those sets of points wherein the rapid color change is due to changes in saturation.

4. The method for determining the color of scene illuminant claimed in claim 3, wherein said step of determining whether the rapid change is due to changes in saturation or hue further comprises the steps of:
   dividing each of points in two subsets, one subset on either side of the rapid color change edge;
   plotting chromaticity values of the points in the subsets on a chromaticity plane;
   fitting a straight line through the chromaticity values of each subset of points;
   determining the slopes of the straight lines fit through the chromaticity values of the respective subsets of points on both sides of the color edge; and
   identifying the rapid color changes in a set of points as due to changes in saturation if the slopes of the straight lines in the subsets of a set of points are equal.

5. The method for determining the color of scene illuminant claimed in claim 4, wherein the step of determining the locus of the intersection of said straight lines further comprises the steps of:
   determining the slope and intercept of the straight line fit through the chromaticity values of each of said set of points, to generate a plurality of points (A,C) on a slope intercept plane, wherein A is the slope and C is the intercept of the straight lines; and
   fitting a straight line K through the points (A,C) in the slope intercept plane to determine an intercept and a slope of the straight line K; the slope and intercept of the line K representing the chromaticity values of the illuminant color.

6. The method for determining the color of scene illuminant claimed in claim 4, wherein the step of determining the locus of the intersection of said straight lines further comprises the steps of:
   quantizing the chromaticity plane into discrete accumulation cells;
   incrementing a count in each of said cells for each one of said straight lines that passes through the cell; and
   selecing the cell receiving the most counts as the locus of intersection of the straight lines.

7. The method for determining the color of scene illuminant claimed in claim 3, wherein the step of detecting points along paths crossing the color edges further comprises the steps of:
   applying a Laplacian filter to the chromaticity components of the transformed digital color image; and
   identifying zero-crossings in the output of the Laplacian filter as the points on the color edges.

8. The method for determining the color of scene illuminant as claimed in claim 7, where the step of applying a Laplacian filter is further characterized by the Laplacian filter being convolved with a Gaussian filter for smoothing noise in the transformed digital color image.

9. The method for determining the color of scene illuminant as claimed in claim 8, wherein the step of applying a Laplacian Guassian filter to the chromaticity components of the transformed digital color image further comprises applying several Laplacian Gaussian filters having different standard deviations, and selecting the output from the filter that detects the maximum number of zero-crossings.

10. A method of reproducing a color photographic image of a scene containing a plurality of different colored specularly reflective surfaces comprising the steps of:
scanning the color photographic image to produce a digital color image; transforming the digital color image to a chromaticity space; processing the transformed digital color image to determine the color of a scene illuminant by determining the color of specularly reflected light in the scene; printing the photographic image using a printing process employing color correction toward an aim point; and employing the illuminant color as the aim point.

11. The method of reproducing a color photographic image claimed in claim 10, wherein the step of determining the color of a scene illuminant by determining the color of specularly reflected light in the scene further comprises the steps of:
detecting a plurality of sets of points in the transformed digital image having constant hue and varying saturation from said plurality of differently colored surfaces in the image; plotting chromaticity values of the detected points in the sets on as chromaticity plane;

fitting a straight line through the chromaticity values of such set; and
determining the locus of an intersection of said straight lines, said locus representing the color of the scene illuminant.

12. A method of scan printing a color photographic image of a scene containing a plurality of differently colored specularly reflective surfaces comprising the steps of:
scanning the color photographic image to produce a digital color image; transforming the digital color image to a chromaticity space; processing the transformed digital color image to determine the color of a scene illuminant by determining the color of specularly reflected light in a plurality of local areas of the digital color image; processing the digital color image, employing the color of scene illuminant determined for local areas of the image to color correct the digital color image in said local areas; and scan printing the digital color image.

13. The method of scan printing a color photographic image claimed in claim 12, wherein the method of determining the color of a scene illuminant in a plurality of local areas of the image further comprises the steps of:
detecting in a local area of the transformed digital color image a plurality of sets of points having constant hue and varying saturation from a plurality of differently colored surfaces in the local area of the image;
plotting chromaticity values of the detected points in the sets on a chromaticity plane;
fitting a straight line through the chromaticity values of each set; and
determining a locus of an intersection of said straight lines, the locus representing the color of the local scene illuminant.

* * * * *